(12) United States Patent
Lynn et al.

(10) Patent No.: US 6,383,250 B1
(45) Date of Patent: May 7, 2002

(54) STEEL MAKING REVERT AND PROCESS FOR PREPARING

(75) Inventors: John D. Lynn, Center Valley, PA (US); Colvin W. Smith, Catonsville, MD (US)

(73) Assignee: Bethlehem Steel Corporation, Bethlehem, PA (US)

( * ) Notice: Subject to any disclaimer, the term of this patent is extended or adjusted under 35 U.S.C. 154(b) by 0 days.

(21) Appl. No.: 09/561,149

(22) Filed: Apr. 28, 2000

(51) Int. Cl.⁷ .................................................. C21C 5/36
(52) U.S. Cl. .............................. 75/313; 75/316; 75/327; 75/751
(58) Field of Search .......................... 75/316, 327, 313, 75/751

(56) References Cited

U.S. PATENT DOCUMENTS

| | | | |
|---|---|---|---|
| 2,710,796 A | 6/1955 | Pinkerton | 75/25 |
| 4,091,545 A | 5/1978 | Izawa | 34/9 |
| 4,133,756 A | 1/1979 | Arai et al. | 210/67 |
| RE30,060 E | 7/1979 | Kreiger | 75/3 |
| 4,606,530 A | 8/1986 | Litchinko et al. | 266/158 |
| 4,711,662 A | 12/1987 | Harada | 75/1 R |
| 4,725,307 A | 2/1988 | Harada | 75/10.29 |
| 5,114,474 A | 5/1992 | Wilheim et al. | 75/751 |
| 5,135,572 A | 8/1992 | Ibaraki et al. | 75/502 |
| 5,518,523 A | 5/1996 | Brotzmann | 75/501 |
| 5,785,737 A | * 7/1998 | Lynn et al. | 75/751 |
| 5,871,561 A | 2/1999 | Okada et al. | 75/658 |
| 6,126,714 A | * 10/2000 | Lynn et al. | 75/316 |
| 6,136,066 A | * 10/2000 | Lynn et al. | 75/531 |
| 6,241,805 B1 | * 6/2001 | Lynn et al. | 75/531 |

OTHER PUBLICATIONS

33 METAL, Mar. 1997, p. 66 "Bethlehem Turning Waste Into Valuable Recharging Material".

* cited by examiner

*Primary Examiner*—Melvyn Andrews

(57) ABSTRACT

Specific recycle materials are blended with hot slag and wet sludge to make a recyclable steelmaking revert. The specific recycle materials are kish, lime, glass, ferro-manganese and the like. The specific materials are blended with the slag and sludge individually or in any desirable combination to form a steelmaking revert. After the recycle materials are blended with the slag and sludge, the recycle blend slag/sludge mixture is allowed to rest to bring the moisture content to less than 10% by weight. The steelmaking revert and process for making the same reduce the need for steelmaking raw materials by employing recycle materials from land fills. Thus, the cost of steel production is reduced.

24 Claims, 3 Drawing Sheets

STEEL MAKING REVERT AND PROCESS FOR PREPARING

BACKGROUND OF THE INVENTION

1. Field of the Invention

The present invention is directed to blends of waste and useful materials in the steelmaking process, and a process for preparing such recycle blends. More specifically, the present invention is directed to recycle blends of heretofore waste materials and useful materials that can enhance the BOF steelmaking process, and the process for making the recycle blends to enhance steelmaking operations.

It is well known in the art of steelmaking that iron bearing dust and sludges generated by steelmaking furnaces and related steel processing facilities contain valuable materials useful in the steelmaking operations. Such waste materials contain iron oxides in an amount up to about 50% by weight, and it is very desirable to recover the iron for use as a steelmaking charge material. In the case of wet sludges, and especially in the case of wet BOF scrubber sludge, high moisture content has made the wet sludge very difficult to handle in a recycling stream. These sludges also contain high proportions of iron oxides that also are desirably recovered through recycling to the steelmaking furnace.

Filter cake produced from wet scrubber typically has a moisture content of about 30% by weight, or higher. The sludges have a relatively high viscosity, causing them to have poor handling characteristics. The sludges stick to conveyors and machinery when attempts are made to convey them as reverts in a recycling stream. They often form sticky agglomerations that clog and shut down equipment and machinery. For example, under test conditions, it has been found that wet sludge having a moisture content of >10% has a flow rate of less than 10 pounds of sludge per minute. Such a low flow rate makes these wet materials very unsuitable for recycling as a steelmaking revert.

Steelmaking dusts are relatively dry, and powdery. In instances where waste steelmaking dust is recycled, the dry powdery conditions of the material may cause environmental dusting problems. To control dusting, water is normally applied to the dry material, thus increasing the moisture content and potentially creating the handling problems attributable to sludges. Attempts to produce a steelmaking revert by combining wet sludges with dry steelmaking dusts have generally been unsuccessful because such reverts introduce high levels of undesirable elements and compounds into the steelmaking process. For example, if sludge from a hot dip coating line is introduced into a recycle stream, zinc levels in the final revert material can be raised to where the blended revert is unsuitable for use in a steelmaking operation. Combining steel plant wastes must be carefully monitored for chemistry to avoid introducing deleterious elements into the steelmaking process.

2. Brief Description of the Related Art

Various apparatus and methods have been developed in the past to reduce the moisture content and/or recover iron from wet sludges. For example, U.S. Reissue Pat. No. 30,060 teaches a process that instantaneously vaporizes the water in sludges by spraying the sludge into a hot (1200° F.) gas stream. U.S. Pat. Nos. 4,091,545 and 4,133,756 teach using a hot gas to reduce the moisture content of wet sludge. U.S. Pat. Nos. 5,114,474, 4,725,307, 4,711,662 and 2,710,769, teach mixing wet sludges and dust with molten slag to produce reverts. The mixture is crushed for recycling after the slag cools and solidifies.

An article in "33 METALPRODUCING," March 1997, discloses a process that forms BOF waste sludge into briquettes. The apparatus used in the process includes a rotary kiln or dryer to remove water from the sludge, a roll-press, screw conveyors, and pug mills. A recycling plant of that sort requires a large capital investment. Moreover, the rotary kiln consumes energy to generate heat for drying the sludge, thus increasing operating costs. The article also discloses using heated molasses as a binder to form the briquettes. The heated molasses also adds cost to the recycling process.

U.S. Pat. No. 5,871,561 discloses a process wherein steelmaking dusts containing iron oxides generated from electric furnaces are formed into briquettes with reducing agents. The briquettes are fired in furnaces to obtain metal that can be recycled as steelmaking material. The briquettes are made either by a press machine or by the addition of binder material. Both means of making the briquettes increase the cost of steelmaking.

U.S. Pat. No. 5,785,737, to Lynn et al., assigned to the assignee hereof and the disclosure of which is incorporated herein by reference, solved the foregoing problems. The process of the '737 Lynn patent provides a steelmaking revert with improved flow rate properties in a recycling stream. Wet sludge and hot slag are combined into a hot slag/sludge mixture, after which the hot slag/sludge mixture is allowed to rest for a period sufficient to allow the hot slag to cause water vaporization and reduce the moisture content of the slag/sludge mixture to <10% by weight. The dehydrated slag/sludge mixture may be recycled as a steelmaking revert. Although the foregoing problems associated with steelmaking were successfully addressed by the '737 patent, there is still a need to further enhance steelmaking operations.

Steel manufacturing operations are costly, and the high manufacturing costs extend to the procurement of raw materials. The process of mining and beneficiating ores and raw materials is a very labor intensive and expensive part of the steelmaking process. Further, disposing of the waste from the hot steelmaking operations as well as from the downstream and finishing operations, can create environmental problems. For example, fine powdery kish produced during steel making may disperse into the air unless appropriate steps are taken. Although the carbon content of the kish suggests that it may be recycled into the steelmaking operations, the fine consistency of the kish makes handling very difficult. The low mass of the kish prohibits it from penetrating the frothy, slag covered surface of the steelmaking furnace, causing it instead to blow out of the furnace. Such a problem is not specific to kish, but to any fine material which has a low mass.

In addition to kish, other waste materials contain raw materials that are used in steelmaking, but like kish are difficult to recycle because of their physical form or low mass. Ferro-manganese is a waste material that has proven difficult to recycle. Ferro-manganese (about 76% Mn, about 15% Fe) is used during steelmaking as a deoxidizer. Addition rates of ferro-manganese to steelmaking furnaces amount to about one ton per heat. Recovery of ferro-manganese from slag rich in ferro-manganese results in low grade fines (about 50%). Ferro-manganese slag has not been suitable for recycling because of the handling required. Other waste materials that are difficult to recycle include glass from municipal recycling facilities, and the like. Such waste materials typically are landfilled, thus creating additional environmental problems.

Landfills are costly to municipalities and steel plant operators, and present environmental hazards. If steelmaking and other waste material could be recycled, the cost to municipalities could be reduced. In addition, environmental hazards would be prevented. Additionally, recycling such waste materials would benefit steelmakers by reducing the high costs associated with procuring raw steelmaking materials. Accordingly, there is still a need to enhance steelmaking operations, and a need to recycle waste material.

SUMMARY OF THE INVENTION

The present invention is directed to a recycle steelmaking revert composed of a carrier containing a slag/sludge mixture blended with other materials and waste materials useful in the steelmaking process. The recycle materials include, but are not limited to, kish, glass, deoxidizing agents such as ferro-manganese, lime fines, and the like. The specific recycle materials are blended into the slag/sludge mixture individually, or the specific recycle materials are blended into the slag/sludge mixture in different combinations. The steelmaking revert comprising the recycle material blended into the slag/sludge carrier preferably has a moisture content of <10% by weight and >4% by weight in order to preclude undesirable dusting.

The present invention is also directed to a method of preparing the recycle blends. The process includes the steps of blending one or more of the recycle materials into wet sludge and hot slag, followed by combining the wet sludge and the hot slag with the blended recycle materials into a recycle blend hot slag/sludge mixture. The recyclable blend hot slag/sludge mixture is allowed to rest for a period sufficient to allow the hot slag to vaporize and reduce the moisture content of the mixture to <10% by weight. The recycle blend slag/sludge mixture may then be recycled as a steelmaking revert or combinations of recycle blends may be recycled as a combination revert as steelmaking operations may require.

Advantageously, the recycle blend slag/sludge mixture and process for making it enhance steelmaking operations. Difficult to handle recycle materials are readily blended in slag and sludge to form a recyclable steelmaking revert that can be immediately used, or can be conveniently stored for later use. Recycling of the materials replaces steelmaking raw materials, and the cost of obtaining such raw materials. Additionally, the present invention eliminates disposal problems for waste materials both for the steel industry and for municipalities. Additionally, the prior costs for landfilling waste materials are thus eliminated, permitting the steelmaking operation to be more productive and efficient. The wastes now become valuable commodities.

A primary object of the present invention is to provide a steelmaking revert formed from difficult to handle waste and other useful materials.

Another object of the present invention is to provide a steelmaking revert that eliminates costly disposal problems.

An additional object of the present invention is to provide a steelmaking revert that can be readily stored.

Still yet another object of the present invention is to provide a steelmaking revert that contains specific recycle materials that may be selectively added to the steelmaking furnace alone or in combination as steelmaking operations may require.

These and other objects and advantages of the present invention are readily apparent in view of the following description and drawings.

DETAILED DESCRIPTION OF THE PREFERRED EMBODIMENT

The steelmaking revert of the present invention is composed of various waste materials blended into a slag/sludge carrier. Many waste materials found at steel plants, municipal dumps, and the like contain raw materials that can be employed in steelmaking. Such raw materials include, but are not limited to, iron oxides, graphic carbon, scrap steel, rubber, deoxidizing agents, and the like. Such waste materials are found in recycle materials such as kish, glass, ferro-manganese and lime fines.

The waste materials employed to make the recycle blends of the invention are blended with BOF scrubber sludge and hot slag produced during steelmaking. As disclosed in my referenced '737 patent, alternating layers of hot slag and wet sludge are used to form a dry slag/sludge mixture having a moisture content of <10% by weight that is suitable for being readily handled for introduction into a steelmaking furnace. The slag/sludge mixture has sufficient unit mass to penetrate the steelmaking surface when the mixture is introduced into the furnace. Glass, kish, lime, ferro-manganese and the like are added to the sludge and slag as the layers are being created to make a steelmaking revert containing recycle material. The slag/sludge mixture serves as a carrier for the material that is to be recycled, thus allowing it also to penetrate the steelmaking surface.

Additionally, the recycle blends formed by the slag/sludge and recycle material may be mixed together in various combinations as desired by the steel manufacturer. For example, glass recycle blend may be combined with kish recycle blend. Thus, the steel maker may create a carefully tailored addition as steelmaking conditions change and/or as different types of steel requiring different additives are made.

Preferably, if the material is not as fine as kish or lime fines, the specific recycle material is ground to a fine state at the site of revert making. Once the specific recycle material is blended into the hot slag and sludge, the hot slag and sludge containing the specific recycle material has alternating layers of slag and sludge. The recycle material slag/sludge mixture is preferably allowed to rest for a time such that the hot slag portion vaporizes moisture from the mixture to less than about 10% by weight. Most preferably, the slag/sludge mixture with the recycle material is allowed to rest such that the slag portion vaporizes moisture from the revert to about 3%–4% by weight. The reduced moisture content of the revert provides for an improved flow rate properties in a recycling stream as discussed below.

Figure 1:
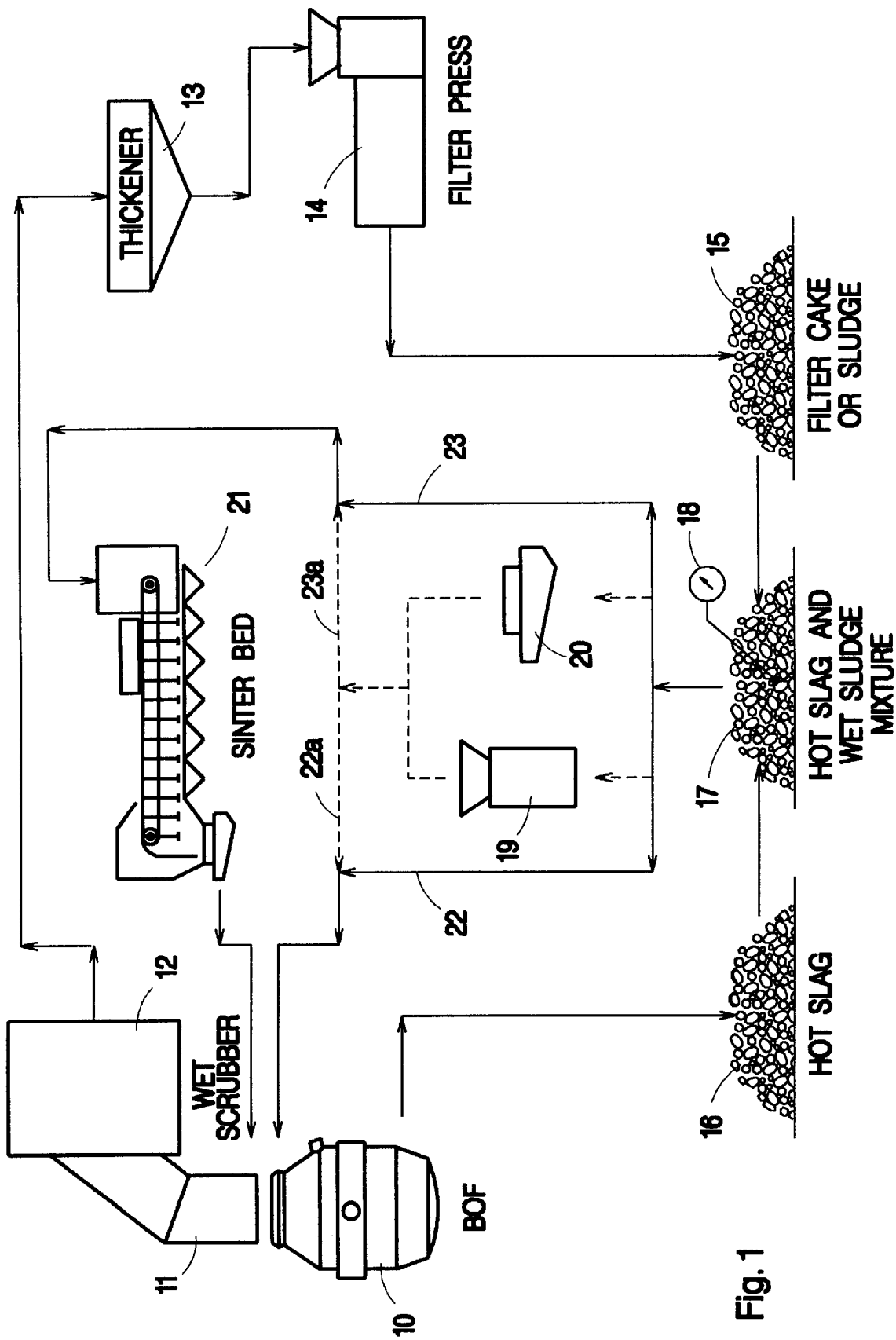
FIG. 1 is a flow diagram illustrating the steps of the process for treating wet steelmaking sludge to produce a steelmaking reverts.

As best shown in FIG. 1 modem steelmaking pollution control devices, such as bag houses, precipitators, cyclones and scrubbers generate large quantities of iron bearing dusts and sludges. The waste materials have a high value due to the iron and carbon content. However, many of these waste materials are very high in water content due to the wet environmental processes, such as wet scrubbers, that are used to control steelmaking emissions. In a preferred embodiment as best shown in FIG. 1 a basic oxygen furnace, (BOF) 10 and hood 11 are positioned above the mouth of the BOF to collect fume and gas that are emitted during the steel refining process. The fume and hot gases are collected in a wet scrubber 12, and the wet scrubber sludge is sent to a thickener 13 where water is removed. A further downstream step in the process typically includes either batch or continuous filtration of the wet sludge. The filtering step is carried out in press 14 where a wet filter cake 15 is produced. The filter cake, or sludge, has a moisture content of about 30% water by weight.

As heretofore mentioned, wet BOF sludge contains iron oxides in amounts of up to about 50% by weight, and it is very desirable to recover the iron for use as a charge material in the steelmaking operation. Iron recovered from the sludge can supplement the iron that is otherwise required to produce steel. The high viscosity of the wet sludge makes it very difficult to handle the material as a steelmaking revert. It has been discovered that if the moisture content of the wet sludge can be reduced to less than about 10% water by weight, the flow rate properties of the sludge are improved and the sludge can be conveniently handled as a steelmaking revert. It has also been discovered that a preferred moisture content of more than about 3%–4% water produces a superior sludge flow rate as a revert.

Figure 2:
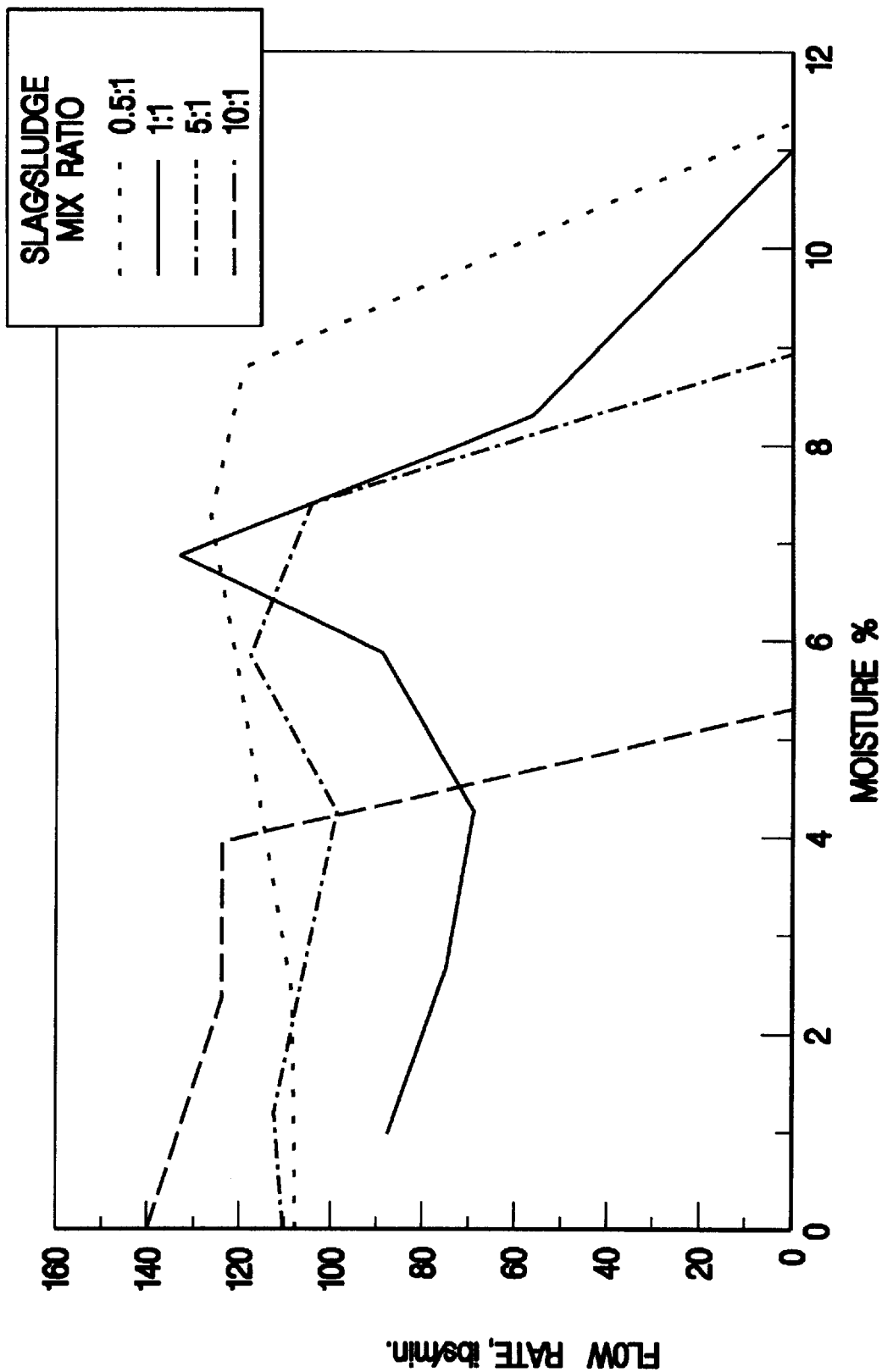
FIG. 2 is a graph showing flow rate measurements in relation to sludge moisture content.

For example, in the graph of FIG. 2, flow rate is plotted against the moisture content of four different mixture ratios ranging from a slag/sludge ratio of 0.05:1 up to a ratio of 10:1. The flow rate tests were conducted in a 2 cubic foot bin having a 65 degree sloped floor to discharge the slag/sludge mixture through a 2½ square inch opening in the bin. The plotted data in FIG. 2 clearly shows that at a preferred 1:1 ratio, the slag/sludge flow rate decreases rapidly when the moisture content of the mixture exceeds 7% water by weight. Above about 8% water content, the flow rate of the material is considered only marginally acceptable. Above 10%, the flow rate becomes very poor and at a moisture content above 11%, there is no material flow.

In order to use wet BOF sludge as a revert in a steelmaking process, it is necessary to reduce the moisture content of the wet sludge to a level where the water in the sludge is less than 10% by weight. As clearly shown in FIG. 2, the moisture content should be reduced to a preferred range of between about 3%–4% to achieve optimum flow, as shown in the plotted data. It has also been discovered, during actual use in a pilot test, that when the moisture content of the wet sludge material falls to a level below 3% dusting can become a problem. If this happens, water must be added to the slag/sludge mixture to bring the moisture content back up into the preferred 3%–4% moisture range to eliminate dusting.

Dehydrating wet sludge is extremely energy intensive. The prior patents disclose sludge drying operations that consume large amounts of energy to generate heat for vaporizing the water in the sludge. It has been discovered that hot slag, at a temperature below the molten liquid state, provides a heat source that can be used with the wet BOF sludge to vaporize the water and lower the moisture content of the sludge. The molten slag has in the past been allowed to cool prior to disposal, so hot slag is found in abundance at steelmaking facilities.

The prior patents teach mixing molten slag with steelmaking dusts and sludges to recover iron from steelmaking waste. Uncontrolled mixing of molten slag with wet sludge is extremely dangerous. Mixing molten slag with water can cause terrifying explosions. In the past, such explosions at steelmaking operations have resulted in injury and death to employees. The prior patents even warn of this problem. For example, Pinkerton discloses, in U.S. Pat. No. 2,710,796, that "Excessive water, however, must be avoided; the generation of steam is too violent. . . " Explosive conditions are completely avoided when hot, not molten, slag is combined with wet sludge to drive off water from the sludge. The present invention avoids the prior problems by using hot but not molten slag to dehydrate the sludge.

Referring again to FIG. 1, hot slag from supply 16 is combined with wet sludge from supply 15 to form a hot slag/wet sludge alternating layer mixture at 17. The preferred and most convenient method for combining the hot slag and wet sludge is to blend alternating batches taken from the supplies 15 and 16. This produces a preferred 1:1 slag/sludge mixture ratio. Care should be taken during blending of the hot slag and wet filter cake or sludge to avoid rapid steam generation. Combining the materials with a front end loader or the like into a bed comprising alternating 1–2 feet thick layers of hot slag and wet filter cake or sludge avoids excess steam generation. This procedure allows for safe evolution of steam, and uniform drying of the filter cake or sludge. Reclaiming the layered pile 17 after curing for about 16 hours results in a uniform blend of the two materials suitable for any downstream processing, i.e., crushing screening, and/or magnetic separation. This procedure is readily done with front-end loader bucket used at most slag processing sites in the steel industry.

The slag/sludge mix rate can be changed to produce slag/sludge ratios up to about 10:1 or down to about 0.5:1. However, when the slag/sludge ratio is changed to increase the slag content in the mixture, the metallurgical impact on finished product quality must be considered. It must be remembered that slag additions introduce removed impurities back into the steelmaking vessel. For example, in most instances, phosphorous is considered detrimental to the quality of steel. Metallurgists attempt to entrap phosphorous and other impurities within the slag cover that floats on the surface of the molten steel bath in the steelmaking vessel. These impurities are removed from the molten steel as the slag is systematically tapped. Hence, increasing the slag content of the slag/sludge mixture needs to consider the possible increased phosphorous levels that might result.

Table I contains the parts by weight chemistry for a 1:1 slag/sludge mixture resulting from BOF slag and BOF scrubber sludge. The table shows that the slag contains 0.7% phosphorous by weight and the sludge contains about 0.06% phosphorous. The resulting combined mixture has about 0.3% by weight phosphorous at a 1:1 slag/sludge mixture ratio. This is an acceptable phosphorous level for BOF charge material. If the 1:1 mixture ratio is changed to increase the slag content, the phosphorous level will increase. For example, if the slag taken from supply 16 is combined with sludge from supply 15 at a 2:1 slag/sludge ratio, the slag/sludge mixture will contain about 0.49% P; at a 5:1 ratio the mixture will contain about 0.59% P; and at a 10:1 ratio it will contain about 0.64% phosphorous.

TABLE I

|  | Slag/Sludge | BOF Slag | BOF Sludge |
| --- | --- | --- | --- |
| Fe | 41.0 | 21.4 | 60.9 |
| Mn | 2.1 | 3.5 | 0.86 |
| P | 0.3 | 0.7 | 0.06 |
| Zn | 0.9 | N/A | 1.4 |
| $SiO_2$ | 6.9 | 12.5 | 1.4 |
| CaO | 20.4 | 46.0 | 4.6 |
| MgO | 6.7 | 5.6 | 1.6 |
| $Al_2O$ | 1.0 | 1.1 | 0.1 |
| $TiO_2$ | 90.3 | N/A | 0.06 |

Various other undesirable elements and compounds can be inadvertently introduced into the recycling stream when different waste materials found throughout a steelmaking operation are added to the slag/sludge mixture. In the above instance we show that the slag/sludge mixture contains an acceptable 0.3% phosphorous level. However, if hot-dip and tin mill sludges were added to the slag/sludge mixture, the zinc and chrome levels of the mixture would increase. Excessive amounts of either zinc or chrome could have deleterious effects on the steel. Therefore, it can be seen that steel makers must carefully monitor revert chemistries in consideration of end use requirements and specifications to avoid introducing undesirable impurities into finished steel products.

Figure 3:
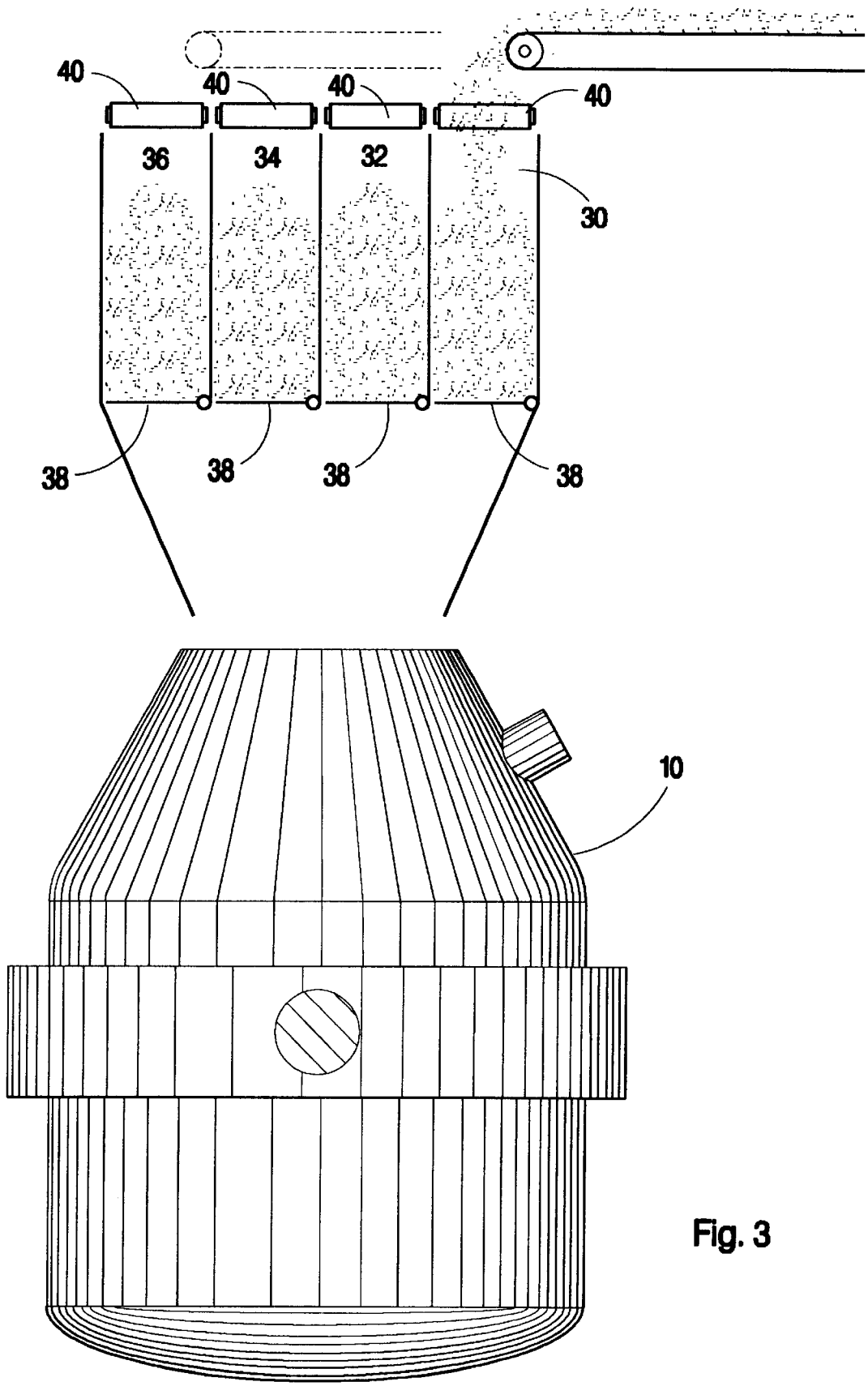
FIG. 3 is a schematic view of a basic oxygen furnace installation with which to carry out the invention.

As best shown in FIG. 3, vessel 10 is disposed below hoppers 30, 32, 34, and 36. Each of the hoppers has a gate 38, any of the gates 38 being selectively activated, for example, by a hydraulic cylinder and piston assemble, servo motor, or the like, in order to cause the gate 38 to be moved between the closed position of FIG. 3 to an open position. In the open position, materials in hopper 30 will fall into vessel 10. There is a limited amount of usable space above vessel 10, due to size considerations and the like, thus precluding an essentially unlimited number of gravity flow hoppers from being positioned above vessel 10.

Conveyor 40 is in communication with hopper 30 in order to supply material thereto. There is a conveyor for each of the hoppers, or alternatively one conveyor may be used to feed all hoppers and thus further reduce space requirements. The conveyor receives material to be added to the hopper 30, after which gate 38 is opened at the appropriate time in order to allow the material to fall into vessel 10. We have found that conveyor 40 to the hopper 38 may feed the recycle blend of the invention, thus permitting the materials to be supplied to the vessel 10 as desired.

Many of the materials to be recycled have a relatively low mass, such as kish. These materials have heretofore been difficult to add to vessel 10 because the atmospheric currents would cause the material to be blown from the vessel 10. In addition, the relatively low mass precluded the materials from piercing the slag layer conventionally overlying the steel bath in the vessel 10. The slag/sludge mixture has a sufficiently high mass to permit the other materials to be carried along into the bath, so that they may be utilized in the steel making process as desired.

Additionally, we envision that a number of individual recycle blends may be prepared in advance for use as needed. Thus, one blend containing glass fines may be prepared, and one with lime, ferro-manganese, etc. Additionally, combinations of two or more materials may be prepared, in order to be available as needed. Thus, if the steel making operator decides that one or more materials in the form of recycle blends are needed, the materials may be removed from storage by a front end loader or the like and supplied to the input end of conveyor 40. Alternatively, the front end loader might prepare a blend from a plurality of previously prepared recycle blends, in order to provide vessel 10 with the particular materials that are at that time required. Thus, the constituent recycle blend may be varied from a number of previously prepared blends as steel making requirements change with time, type of steel, etc.

The specific recycle material may be added individually to make a single specific type revert, or two or more of the recycle materials may be combined to make a revert. The various combinations and proportions of the specific recycle materials in the blends are unlimited. The standard slag/sludge carrier blended with the specific recycle material has a total iron content of from about 45% to about 60% by weight. Elemental iron ranges from about 5% to about 10%, ferrous iron ranges from about 15% to about 20%, and ferric iron ranges from about 25% to about 30% by weight. Sulfur and phosphorous range from about 0.05% to about 0.5% by weight. Zinc ranges in amounts of from about 0.5% to about 1.0%; manganese ranges from about 1.5% to about 2.5%; calcium from about 10% to about 13%; magnesium ranges from about 2.0% to about 6.0%; silicon ranges from about 2.0% to about 5.0%; and aluminum ranges from about 0.2% to about 1.0% by weight of the carrier.

The average range, however, for glass fines in the recyclable blends is from about 8.0% to about 15.0% by weight, preferably, from about 10% to about 13% by weight. The lime fines range is from about 1% to about 8.0% by weight, preferably, from about 5% to about 7% by weight. Kish ranges from about 5% to about 15% by weight, preferably, from about 9% to about 12%. The deoxidizing agents, such as ferro-manganese middling fines, range from about 2% to about 12% by weight, preferably, from about 5% to about 10%. Table II contains one chemical analysis of a slag/sludge standard carrier when blended with six specific recycle materials within the scope of the present invention. The numerical values in Table II are in percent by weight. The desired proportion of each recycle material added to the slag/sludge carrier is based upon the specification of the desired finished steel product. Based upon data provided by BOF operators, computers are used to accurately calculate the desired amounts of recycle material to blend with the carrier.

The slag/sludge mixture containing the blended recyclable material is allowed to rest or cure for an extended time period as shown at 17 in FIG. 1. This enables energy emitted from the hot slag to vaporize water in the sludge and reduce the total water content of the mixture to less than about 10% by weight. The water content of the slag/sludge is monitored with meters 18 to determine when the moisture content of the mixture falls below the 10% level. Actual pilot plant operations have shown that the slag/sludge mixture should be allowed to rest or cure for a time period of up to about 16 hours to vaporize a sufficient amount of water to reduce the moisture content to the preferred 3%–4% moisture level.

After the recycle material blend slag/sludge mixture is dehydrated to the desired 3%–4% moisture range, its flow rate properties are satisfactory and it is sent downstream for additional processing. These additional processing steps can include magnetic separation 19, screening 20 and/or sintering 21. In mixtures that contain high zinc levels of about 0.9% and above, the mixtures are not considered suitable for use in a sinter bed operation 21, and mixtures are charged directly into the BOF with or without magnetic separation and/or screening as shown by lines 22 and 22a. In recycle blend slag/sludge mixtures where the zinc concentration is lower than about 0.9% by weight, the mixture can be added to the sinter bed 21 with or without magnetic separation and/or screening as shown by lines 23 and 23a. However, it should be understood that low zinc level recycle blend slag/sludge mixtures could be charged directly into a BOF without sintering.

TABLE II

|  | Standard Blend | Glass 11% | Lime 6.25% | Ferro-Manganese 6.25% |
|---|---|---|---|---|
| Fe Total | 56 | 50 | 52.4 | 53.1 |
| Fe | 7.8 | 6.9 | 7.3 | N/A |

TABLE II-continued

|  | Standard Blend | Glass 11% | Lime 6.25% | Ferro-Manganese 6.25% |
|---|---|---|---|---|
| Fe +2 | 18.6 | 16.6 | 17.4 | N/A |
| Fe +3 | 29.6 | 26.5 | 27.7 | N/A |
| S | 0.1 | 0.1 | 0.1 | 0.1 |
| P | 0.3 | 0.2 | 0.2 | 0.2 |
| Zn | 0.9 | 0.8 | 0.8 | 0.8 |
| Mn | 2.1 | 1.9 | 2.0 | 5.1 |
| Ca | 11.0 | 9.8 | 12.3 | 10.3 |
| Mg | 4.0 | 3.6 | 3.7 | 3.7 |
| Si | 3.2 | 7.9 | 3.0 | 3.0 |
| Al | 0.5 | 0.4 | 0.4 | 0.4 |

It has been discovered that fine particles, about 20 mesh (−0.03 in.), in the reclaimed recycle blend slag/sludge mixture that has particles ranging up to about 0.5 inches in size, can present a problem if the recycle blend slag/sludge revert is charged directly into a BOF. It has also been discovered that such fine particles can be fed directly into a sinter plant without presenting any known problems in the sintering operation. When the smaller 20 mesh fines are charged directly into a BOF, they may be carried out of the vessel with the off-gases. This overloads the gas cleaning scrubber system and negates the recycling effort.

In order to solve this problem, lime can be added to the wet filter cake or sludge 15 in an amount of about 1% by weight if there is no lime already in the blended recycle materials. It is believed that the lime addition causes micropelletization of the fines during crushing and screening operations downstream from the blending process shown at 17. The many conveyor-to-conveyor transfer points, and the various water sprays located throughout a recycling operation, cause the lime to act as a binder and enhance agglomeration of the recycle blend slag/sludge fines into micropellets. This reduces the amount of 20 mesh fines within the dried recycle blend slag/sludge mixture and makes the revert more suitable for charging directly into a BOF vessel.

Under actual plant conditions the lime blended, and the agglomerated recycle blend slag/sludge mixture, was charged into a BOF without any noticeable increase of fines in the off-gases. The lime blending techniques also reduced dusting problems during handling and charging of the blended material. As a result, the moisture content of the recycle blend slag/sludge mixture can be further reduced to a preferred range of between about 2%–4% by weight when lime additions are blended with the filter cake.

Advantageously, the present invention reduces the cost of steelmaking by providing an alternative source of raw materials by employing waste materials from landfill and steel plants. No new facilities are needed to practice the invention; thus, no additional capital expenditure is required. Accordingly, the present invention provides major capital savings for both steel plants and municipalities. At the same time potential hazards to the environment are avoided.

It should be understood that this process is not limited to steelmaking operations. Any hot dross can be used as a heat source to dehydrate wet sludge produced by metal refining or smelting operations, and that such dross/sludge mixtures can be recycled back into their respective refining or smelting operations.

While this invention has been described as having a preferred design, it is understood that it is capable of further modifications, uses, and/or adaptations following in general the principle of the invention and including such departures from the present disclosure as come within known or customary practice in the art to which the invention pertains, herein, and fall within the scope of the invention limited by the appended claims.

We claim:

1. A steelmaking revert comprising a slag/sludge carrier blended with recycle material, the steelmaking revert having a moisture content of <10% by weight, wherein the recycle material is selected from the group consisting of glass, kish, ferro-manganese and combinations thereof.

2. The steelmaking revert of claim 1, wherein the recycle material includes lime.

3. The steel making revert of claim 1, wherein the steelmaking revert has a moisture content of from about 3% to about 4% by weight.

4. The steelmaking revert of claim 1, wherein the slag/sludge carrier is combined in a stratum of alternating slag/sludge layers.

5. The steelmaking revert of claim 1, wherein the total iron content of the slag/sludge carrier is from about 45% to about 65% by weight.

6. The steelmaking revert of claim 1, wherein the sulfur and phosphorous content of the slag/sludge carrier is from about 0.05% to about 0.5% by weight.

7. The steelmaking revert of claim 1, wherein the zinc content of the slag/sludge carrier is from about 0.5% to about 1.0% by weight.

8. The steelmaking revert of claim 1, wherein the manganese content of the slag/sludge carrier is from about 1.5% to about 2.5% by weight.

9. The steelmaking revert of claim 1, wherein the silicon content of the slag/sludge carrier is from about 2.0% to about 5.0% by weight.

10. The steelmaking revert of claim 1, wherein the aluminum content of the slag/sludge carrier is from about 0.2% to about 1.0% by weight.

11. The steelmaking revert of claim 1, wherein the glass content comprises from about 8.0% to about 15.0% by weight.

12. The steelmaking revert of claim 2, wherein the lime content ranges from about 1.0% to about 8.0% by weight.

13. The steelmaking revert of claim 1, wherein the kish content ranges from about 5.0% to about 15% by weight.

14. The steelmaking revert of claim 1, wherein the ferro-manganese content ranges from about 2.0% to about 12.0%.

15. A process for preparing a steelmaking revert comprising:

a) blending at least a first recycle material with hot slag and wet sludge, wherein the recycle material is selected from the group consisting of glass, kish, ferro-manganese and combinations thereof;

b) combining the hot slag and wet sludge containing the blended recycle material to form a slag/sludge mixture; and c) allowing the hot slag with the wet sludge containing the recycle material to rest for a period sufficient to reduce the moisture content of the mixture to a desired amount.

16. The process of claim 15, wherein the moisture content is between 2.0% to about 4.0% by weight.

17. The process of claim 15, wherein the wet sludge is BOF scrubber sludge.

18. The process of claim 16, wherein the recycle material includes lime.

19. The process of claim 15, wherein the slag/sludge mixture is combined at a slag/sludge ratio of 1:1.

20. The process of claim 15, wherein the slag/sludge mixture is combined at a slag/sludge ratio of less than or equal to 10:1.

21. The process of claim 20, wherein the glass content comprises from about 8.0% to about 15.0% by weight of the revert.

22. The process of claim 18, wherein the lime content comprises from about 1.0% to about 8.0% by weight of the revert.

23. The process of claim 20, wherein the kish content comprises from about 5% to about 15% by weight of the revert.

24. The process of claim 20, wherein the ferro-manganese content comprises from about 2% to about 12% by weight of the revert.

* * * * *